United States Patent
Karthaus

(10) Patent No.: US 8,720,661 B2
(45) Date of Patent: May 13, 2014

(54) CLAMPING-ROLLER FREEWHEEL FOR AN ADJUSTMENT DEVICE IN A MOTOR VEHICLE

(75) Inventor: Ulrich Karthaus, Remscheid (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 547 days.

(21) Appl. No.: 13/033,935

(22) Filed: Feb. 24, 2011

(65) Prior Publication Data

US 2011/0203893 A1    Aug. 25, 2011

(30) Foreign Application Priority Data

Feb. 24, 2010   (DE) .................... 10 2010 002 314
Jul. 8, 2010    (DE) .................... 10 2010 031 133

(51) Int. Cl.
    *F16D 41/067*    (2006.01)
(52) U.S. Cl.
    USPC ............... 192/223.2; 297/362; 188/82.84
(58) Field of Classification Search
    CPC .... F16D 41/067; F16D 41/066; F16D 41/064
    USPC .............. 192/223.2, 15; 188/82.84
    See application file for complete search history.

(56) References Cited

U.S. PATENT DOCUMENTS

| | | | | |
|---|---|---|---|---|
| 2,171,458 A | * | 8/1939 | Swartz | 192/223.2 |
| 6,288,464 B1 | * | 9/2001 | Torii et al. | 310/78 |
| 2003/0173182 A1 | * | 9/2003 | Kim | 192/223.2 |
| 2006/0011439 A1 | * | 1/2006 | Henriksson | 192/45 |
| 2006/0278494 A1 | * | 12/2006 | Itomi | 192/223.2 |

FOREIGN PATENT DOCUMENTS

| | | |
|---|---|---|
| DE | 195 40 631 | 6/2009 |
| DE | 10 2009 028 213 | 2/2010 |
| EP | 497 007 | 11/1994 |
| EP | 1 152 168 | 10/2005 |

* cited by examiner

Primary Examiner — David D Le
Assistant Examiner — Mark Manley
(74) Attorney, Agent, or Firm — McCarter & English, LLP

(57) ABSTRACT

A clamping-roller freewheel for an adjustment device in a motor vehicle includes a housing, a cylindrical lateral surface that defines an axis, at least one roller, an output shaft that is central to the axis, and a clamping contour which is located on the side of the roller opposite from the cylindrical lateral surface and rotationally connected to the output shaft. The clamping contour is a double clamping contour. The roller is allocated to the double clamping contour. The double clamping contour has a left and a right clamping area. A clamping action arises due to the cooperation of the roller with the left or right clamping area, depending on the direction of rotation, and the cylindrical lateral surface.

19 Claims, 4 Drawing Sheets

CLAMPING-ROLLER FREEWHEEL FOR AN ADJUSTMENT DEVICE IN A MOTOR VEHICLE

CROSS-REFERENCE TO RELATED APPLICATIONS

This application claims priority to German Application No. DE 10 2010 002 314.0, filed Feb. 24, 2010 and to German Application No. DE 10 2010 031 133.2, filed Jul. 8, 2010, which are hereby incorporated by reference in their entirety as part of the present disclosure.

BACKGROUND OF THE INVENTION

The invention relates to a clamping-roller freewheel for an adjustment device in a motor vehicle, in particular in a motor vehicle seat, the clamping-roller freewheel comprising a) a housing having a cylindrical inner surface defining an axis, b) at least one pair of rollers having two rollers, the rollers being in contact with the inner surface, c) an output shaft central to the axis, and d) a clamping member which is located on the side of the rollers opposite to the inner surface and rotationally connected to the output shaft. The clamping-roller freewheel is also named clamping-roller freewheel hub or clamping-roller device.

Such a clamping-roller freewheel is known from DE 10 2009 028 213 A1. Such clamping-roller freewheels are preferably used for step-by-step ratchet mechanisms as they are known, for example, from EP 1 152 168 B1 and DE 195 40 631 C2.

With regard to further prior art, reference is made to EP 497 007 B1, in which, however, inclined clamping surfaces are disposed on the housing and not on the clamping member. The clamping member has a cylindrical outer surface.

In the case of such clamping-roller freewheel, a locking moment that is as large as possible is desired; it is supposed to be greater than 60 Nm, with Hertz pressure being taken into account. The minimum ultimate moment is supposed to be greater than 200 Nm. It is another goal that, over the angle of rotation, the locking moment at first has a smaller gradient and then, above a certain angle of rotation, a larger gradient. Above a further angle of rotation, the clamping action is supposed to be maintained at as high and constant a level as possible, before permanent deformation or damage sets in.

The known clamping-roller freewheel comprises n rollers. Half of them are responsible for one direction of rotation, the other half for the other direction of rotation. Therefore, the locking moment in one direction is only effected by half, n/2, of the rollers. The other half of the rollers is passive in this case. In order to increase the locking moment, the number n of the rollers in the clamping-roller freewheel could be increased. However, an increase in the size of the clamping-roller freewheel is not desired. The space in the clamping-roller freewheel is limited.

SUMMARY OF THE INVENTION

It has set itself the object of improving and increasing the locking moment of a clamping-roller freewheel such as the one mentioned in the introduction, to do so while maintaining the size of the clamping-roller freewheel and, if possible, also without other additional components or expensive measures. This object is achieved with a clamping-roller freewheel with the features described below.

In this clamping-roller freewheel, two inclined clamping surfaces are allocated to each individual roller. They run in opposite directions. They are positioned in a V shape relative to each other. Each individual roller can cooperate with each of its two inclined clamping surfaces. It is thus capable of acting in both clamping directions.

The clamping-roller freewheel according to the invention is advantageous in that it at first acts like the clamping-roller freewheel according to the prior art when it comes into the clamping state. If there is a rotary movement on the pinion, those rollers, i.e. 50% of the total number n of the rollers, are first clamped or assume a clamping position that are in contact with that inclined clamping surface of their two inclined clamping surfaces which locks in the clamping direction. In the initial position, the two rollers of a pair of rollers rest on the one of their two inclined clamping surfaces that are the furthest apart.

If the pinion now rotates further about a certain angle, the other rollers also come into the clamping position. In the process, the cage transfers the relative movement of the roller of the pair of rollers that is already clamping onto the other roller of the pair of rollers. In the case of larger moments, in particular in the case of a crash, both rollers of a pair of rollers are therefore clamped through the double clamping contour according to the invention. Because very large spreading forces now act on the housing, there is preferably a limitation after a predetermined further angle of rotation.

Therefore, the clamping-roller freewheel according to the invention works in two successive angle ranges. In the first angle range, it works in accordance with the prior art; the occurring moments are absorbed without any permanent deformation. In the case of higher loads, such as, for example, during a crash, the rollers of the other direction of rotation are added, when the second angel range is reached, to those rollers that are already clamped, so that a locking moment is provided which is now greater. This is achieved by means of the double clamping contour. Each of the rollers lies prismatically between a left-hand inclined clamping surface and a right-hand inclined clamping surface. The rollers themselves are located in a cage and are preferably held in a preferred position by means of spacers so that an immediate clamping action occurs for each direction of rotation. Complete freedom from play can be achieved if the spacers are configured to be resilient or at least partially resilient.

In a preferred embodiment, the clamping-roller freewheel additionally comprises a release gear that is central to the axis, and further comprises a tappet device disposed between the release gear and the cage. A torque for the drive, which can then be picked off at the pinion, can be introduced from the outside by means of the release gear. The effect of the tappet device is that, ultimately, a rotation of the release gear also causes a rotation of the cage and vice versa. The tappet device preferably has a tappet clearance angle a; this means that a rotation of the release gear is transferred onto the cage not until the release gear is rotated by the tappet clearance angle and vice versa.

In another advantageous embodiment, the clamping-roller freewheel additionally has a transmission device provided between the release gear and the pinion. It ultimately causes the release gear and the pinion to be rotatably connected. It preferably has a transmission clearance angle b which causes a rotary movement on the release gear to be transmitted onto the pinion not until the transmission clearance angle b has been used up and vice versa.

Preferably, the tappet device and the transmission device comprise coupling elements. For example, the cage has journals and the release gear has windows. The journals reach into the windows. The clearance angle is formed in the circumferential direction between the journal and the window. In the case of the transmission device, the pinion preferably is connected to a spline profile that reaches into a central opening of the release gear. The opening comprises stop surfaces for the spline profile, with the clearance angle again being taken into account.

BRIEF DESCRIPTION OF THE DRAWINGS

Other advantages and features of the invention become apparent from the other claims as well as from the following description of an exemplary embodiment of the invention, which shall be understood not to be limiting and which will now be described with reference to the drawing, in which:

DETAILED DESCRIPTION OF THE INVENTION

Figure 1:
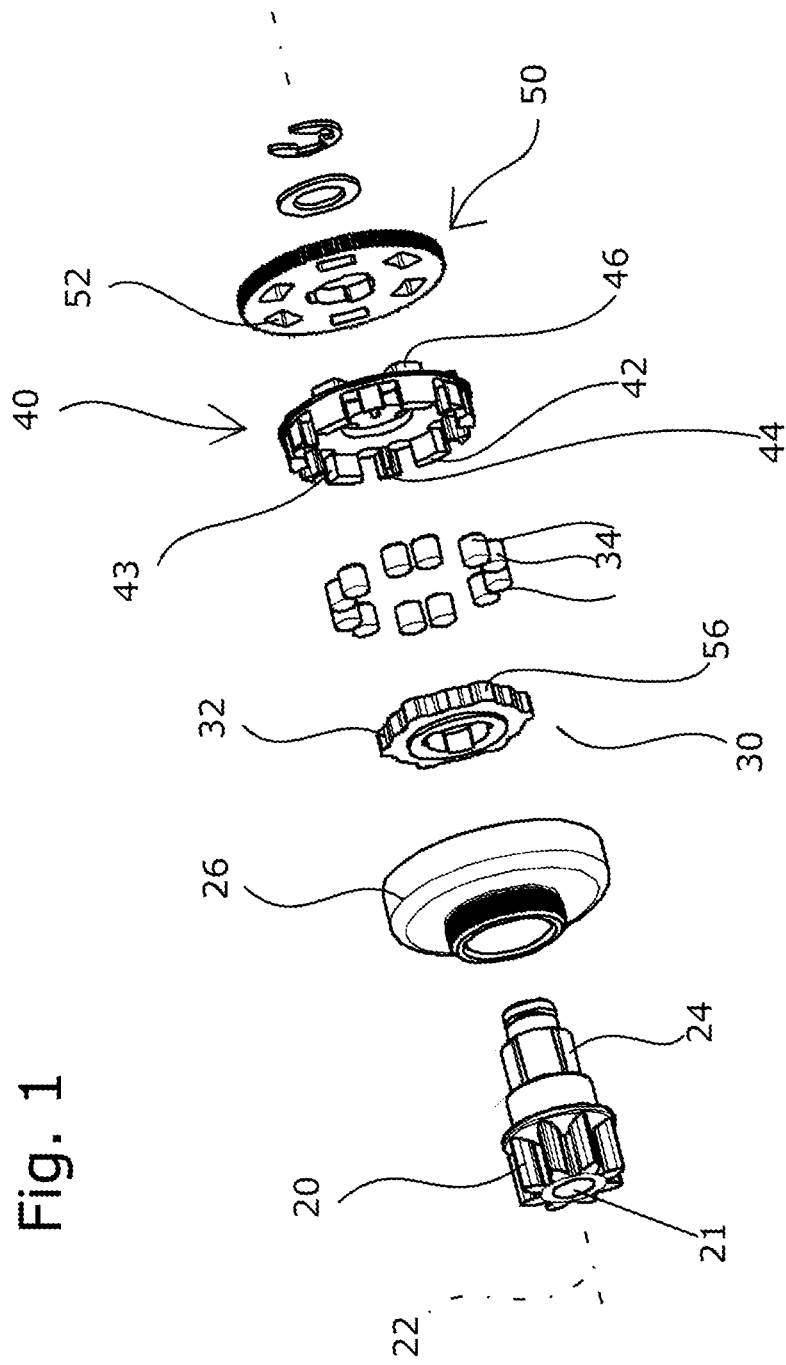
FIG. 1 shows a perspective assembly illustration of the clamping-roller freewheel.
Figure 2:
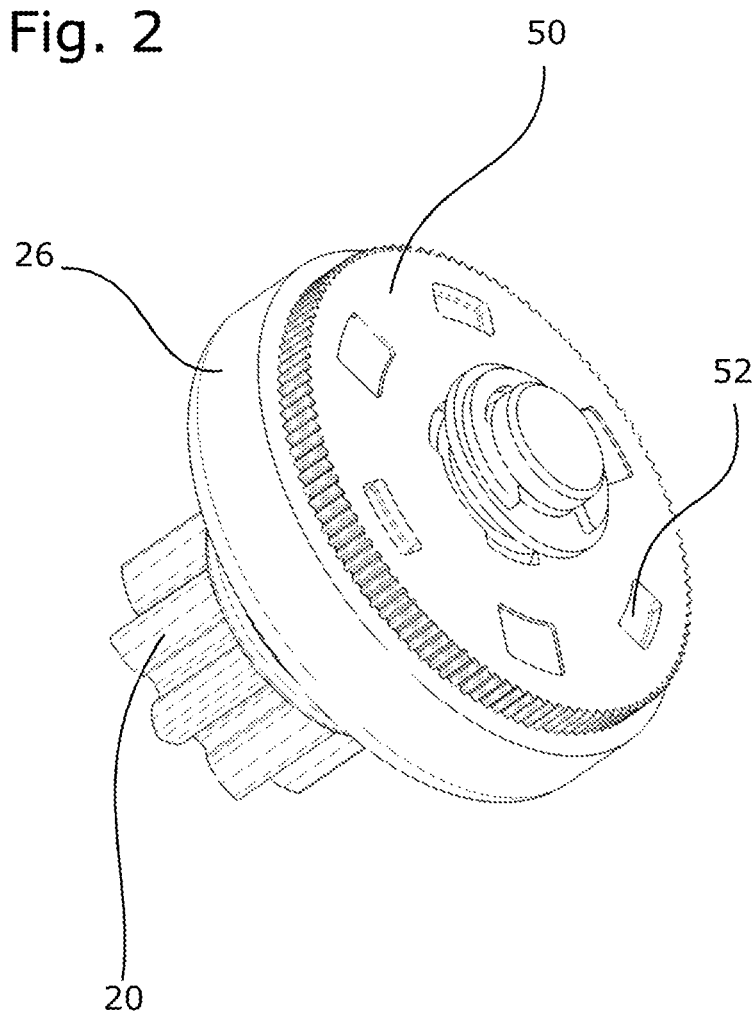
FIG. 2 shows a perspective view of the clamping-roller freewheel viewed obliquely from the rear onto the release gear.

The clamping-roller freewheel comprises a pinion 20 that is placed on an output shaft 21 and rotatable about an axis of rotation 22. In the assembled state of the clamping-roller freewheel, this pinion 20 protrudes freely on one side. The pinion 20 is connected to a spline profile 24 via a collar portion. On its other end portion, it has a stub on which securing means can be attached that hold the clamping-roller freewheel together and close it. A housing 26 is in contact with the collar portion and is able to rotate about the collar portion with a bearing portion.

The housing 26 has a cylindrical inner surface 28 which is central to the axis 22. The housing 26 is cup-shaped; it is open in the direction facing away from the pinion 20. A clamping member 30 fits into the open space of the housing 26. The clamping member has a hole adapted to the spline profile 24, so that the clamping member 30 is non-rotatably connected with the pinion 20 and thus with the output shaft 21. The clamping member 30 has the shape of a perforated disk. On its radial outer surface, it has a number n of V-shaped arrangements 32. Each of the latter has a left and a right inclined clamping surface. The V-shaped arrangement 32 is respectively symmetrical to a radial. The radial outer surface of the clamping member is also referred to as the side opposite to the inner surface 28.

The clamping-roller freewheel has a total of n rollers 34 forming n/2 pairs of rollers. One roller 34 is allocated to each V-shaped arrangement 32. In the normal or initial state, the rollers 34 of a pair of rollers are located on the spaced-apart inclined clamping surfaces of the V-shaped arrangements 32. These inclined clamping surfaces are hereinafter referred to as outer inclined clamping surfaces. In the initial state, the rollers 34 therefore do not have any contact with adjacent inclined clamping surfaces of the V-shaped arrangements 32 of a pair of rollers. These inclined clamping surfaces are hereinafter referred to as inner inclined clamping surfaces.

In a preferred embodiment, the two V-shaped arrangements 32 extend with one outer and one inner inclined clamping surface, respectively, in the shape of a W.

Further, the clamping-roller freewheel has a cage 40. It has a disc-shaped basic body. Tappets 42 protrude therefrom in the axial direction. They reach between pairs of the rollers 34.

One spacer element 44, respectively, which protrudes from the disk in the same direction as the tappets 42 is provided between two tappets 42. It is located between the two rollers 34 of a pair of rollers. In the circumferential direction, the tappets 42 form at least one contact surface 43. One roller 34 rests against one contact surface 43, respectively.

Journals 46 protrude on the other side of the disc-shaped basic body of the cage 40. The cage 40 has a central hole with which it grips around the spline profile in a rotatable manner.

Outside of the cage 40, as seen from the pinion 20, there is a release gear 50. It has an external toothing via which a torque can be introduced into the release gear 50, for example by means of a drive as it is known from the type mentioned in the introduction. The release gear 50 is disc-shaped. It has a central opening, which, together with the spline profile 24, forms a transmission device. This transmission device has a transmission clearance angle which will be discussed later. The release gear has windows 52 into which the journals 46 reach. The journals 46 and the windows 52 together form a tappet device. This has a tappet clearance angle a.

Figure 3:
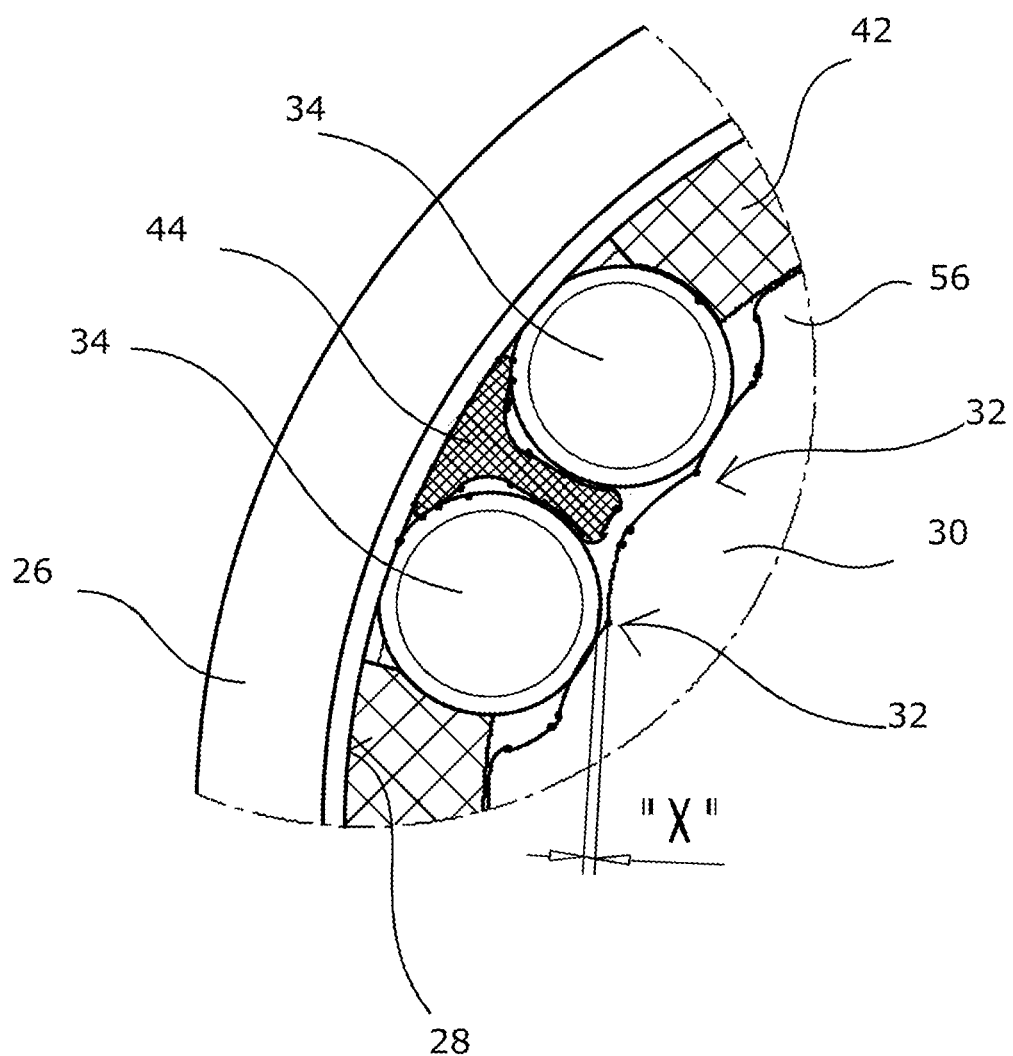
FIG. 3 shows, in a sectional view in a radial sectional plane and greatly enlarged, a detail with a pair of rollers and the immediately surrounding components.
Figure 4:
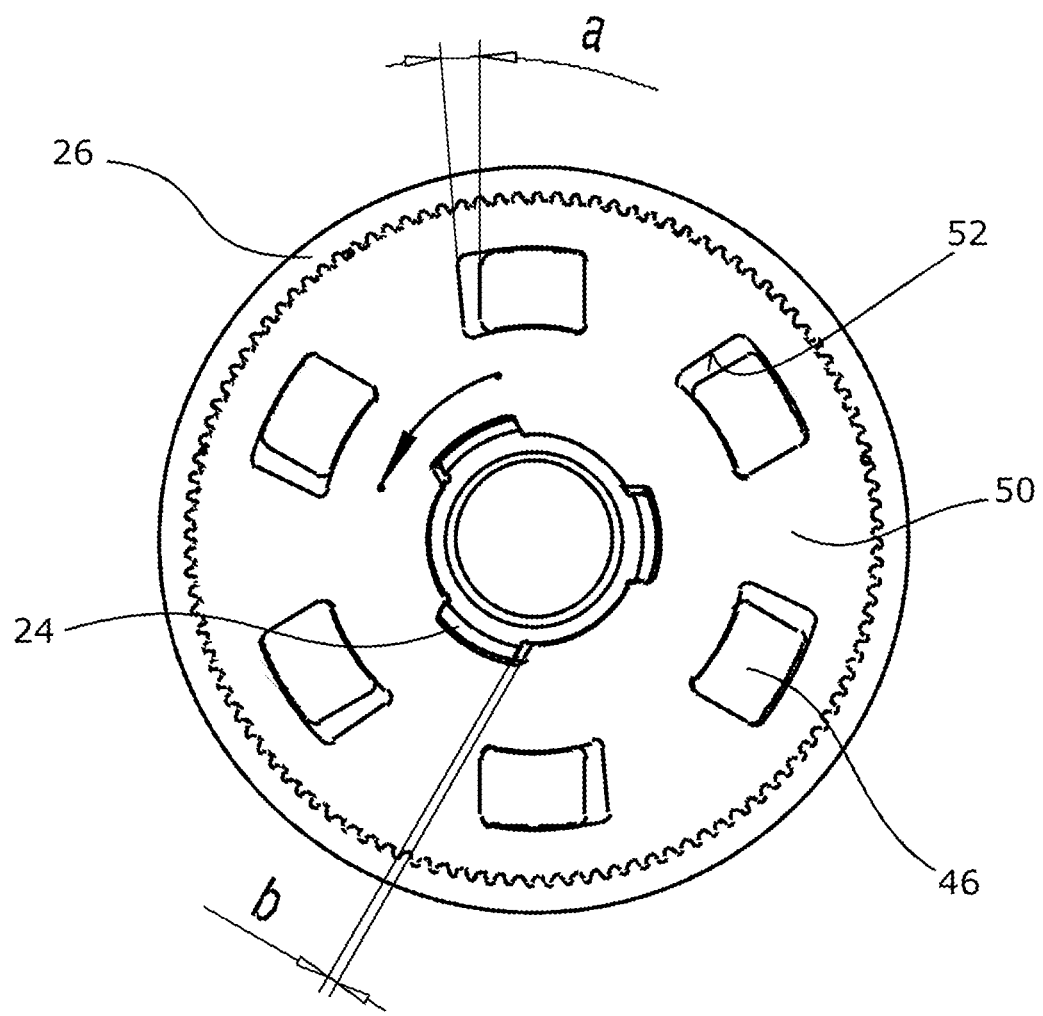
FIG. 4 shows an axial view onto the clamping-roller freewheel with a top view onto the release gear.

FIG. 3 shows the initial state. In the initial state, each of the two rollers of the pair of rollers concerned rests against the outer inclined clamping surface of its V-shaped arrangement 32. The distance from the inner inclined clamping surface of the associated V-shaped arrangement 32 is X. The two V-shaped arrangements 32 of the pair of rollers together extend in a W-shape. The outer clamping legs do not extend in a straight line towards the outside, but, from an initial gradient in the connection point of the two inclined clamping surfaces of a V-shaped arrangement, transition into a gentler gradient towards the outside, so that there, they include a smaller angle with the inner surface 28 which is radially opposite. They extend further towards the outside over a contact flank associated with a protrusion 56 located between two pairs of rollers. This contact flank is significantly steeper than the clamping flanks and limits the possible travel of the rollers 34.

In an alternative, the spacer element can be omitted; the rollers 34 of a pair of rollers have immediate contact in that case. However, even in the case of an immediate contact of the two rollers, a reduced element can be provided instead of the spacer element 44, which is located in the triangle between the two rollers 34 of the pair and the inner surface 28 and biases the rollers 34 towards the inside. Preferably, the contact surfaces 43 are configured such that they bias or press the rollers radially towards the inside. It is desired and advantageous that the rollers are radially biased towards the inside.

The above-described tappet device provided at the transition between the release gear 50 and the cage 40 and the transmission device provided at the transition between the release gear 50 and the pinion 20 enable the rotational plays required for the clamping action. Without the rotational plays, a drive torque would be transmitted from the pinion 20 directly via the release gear 50 onto the cage 40, and the rollers 34 would become unclamped.

In contrast, rotational play is rather undesirable when actuating the clamping-roller freewheel, since it leads to losses in the output. After an actuation, the release gear 40 is preferably retained by a small frictional moment, so that the play is almost zero and losses are largely avoided in the case of a renewed actuation in the same adjustment direction. It is not until the direction is changed during actuation that the rotational play has to be completely bridged once before a drive can be effected. The rotational play is characterized by the switching angle and is, for example, 4.5°.

Depending on the load state and the actuation direction of the clamping-roller freewheel, either the rollers 34 are entrained through the cage 40, or the pinion 20 is first entrained by the release gear 50. Therefore, the above-described rotational plays can have the same absolute value with regard to the design configuration. However, the setting preferably is such that the rollers 34 are entrained first. In the reverse case, an uneven action could be the result because the pinion 20 is non-rotatably connected to the clamping member 30. Since the pair of rollers are each in a preferred position, namely on the outer inclined clamping surface, and since, in the case of actuation through the cage 40, the rollers 34 are only prevented from running up against the outer inclined clamping surfaces, the spacer element 44 normally keeps the rollers 34 away from the inner inclined clamping surfaces, see distance X. At the same time, the spacer element 44 also causes the forward feed of the second roller of the pair of rollers when the first roller is displaced by the cage 40.

The spacer element 44 can be resilient, rigid or both resilient and rigid. Preferably, the spacer element 44 is rigid at the place that connects the center of the two rollers 34 of the pair of rollers. The distance between the rollers of the pair of rollers is thus ensured. Otherwise, the spacer element 44 can preferably be resilient, for example in the triangle area between the two rollers of the pair of rollers and the inner surface 28.

The clearance angle a and/or the transmission clearance angle b are in the range of from 2° to 10°, in particular about 5°.

A typical sequence of operations is as follows: If a torque acts on the pinion 20 and if the pinion 20 is rotated relative to the retained housing 26, then after about 2° of rotation of the pinion, the roller 34 of the pair of roller respectively clamping in the direction of rotation is clamped by about 1°. The second roller 34 of the respective pair of rollers is also clamped via the cage 40. After a rotation of the pinion by 2.5°, the release gear 50 is entrained by the pinion 20. After another 2.5° of rotation, the release gear 50 runs up against the journals 46 of the cage 40. After 7° of rotation of the pinion, the rollers, which originally clamped in the direction of rotation, come up against the respective protrusion 56.

The drawing in FIG. 3 is made to scale. The individual dimensions are thus be apparent from it and can be determined due the fact that the rollers 34 have a diameter of 5 mm. The dimension X can also be determined in this manner.

The clamping-roller freewheel for an adjustment device in a motor vehicle, in particular in a motor vehicle seat, comprises a housing 26, a cylinder surface which defines an axis and is either formed by a cylindrical inner surface 28 of the housing 26 or by a cylindrical lateral surface of a bearing ring, at least one roller 34, the roller 34 coming into contact with the cylinder surface, an output shaft 21 that is central to the axis 22, a clamping contour that comes into contact with the roller 34 which is located on the side of the roller 34 opposite from the cylinder surface and rotationally connected to the output shaft 21, the clamping contour is a double clamping contour comprising a left-hand inclined clamping surface and a right-hand inclined clamping surface. The cylinder surface is also named cylindrical lateral surface. The left-hand inclined clamping surface is also called left clamping area and comprises a left leg. The right-hand inclined clamping surface is also called right clamping area and comprises a right leg.

The clamping-roller freewheel for an adjustment device in a motor vehicle, in particular in a motor vehicle seat, comprises a housing 26 which has a cylindrical inner surface 28 defining an axis 22, at least one pair of rollers comprising two rollers 34, the rollers 34 are in vicinity or in contact with the inner surface 28, an output shaft 21 that is central to the axis 22, a clamping member 30 which located on the side of the rollers 34 opposite from the inner surface 28 and which is rotationally connected to the output shaft 21, the clamping-roller freewheel further has a cage 40 which in the circumferential direction has at least one contact surface 43 for each roller 34 against which one roller 34 rests, and that the clamping member 30, for each roller 34, comprises a V-shaped arrangement 32 with a left-hand inclined clamping surface and a right-hand inclined clamping surface. The clamping member is also called clamping contour.

The applicants reserve the right to be able to combine features and also sub-features of individual claims and/or of individual sentences of the description in any way, even if such a combination is not immediately apparent from the context.

What is claimed is:

1. A clamping-roller freewheel for an adjustment device in a motor vehicle, the clamping-roller freewheel comprising:
   a housing;
   a cylindrical lateral surface defining an axis;
   at least one roller arranged adjacent to the cylindrical lateral surface;
   an output shaft arranged central to the axis; and
   a clamping contour located on a side of the at least one roller opposite from the cylindrical lateral surface and rotationally connected to the output shaft;
   wherein the clamping contour includes a double clamping contour for each of said at least one roller, the at least one roller is allocated to a respective double clamping contour, and each double clamping contour has a left clamping area and a right clamping area defining a radially symmetric V-shaped arrangement,
   wherein, in a clamping state of the clamping-roller freewheel, the at least one roller is in contact with one of the left clamping area and the right clamping area, depending on a direction of rotation, and is in contact with the cylindrical lateral surface,
   wherein the at least one roller comprises at least one pair of rollers with two rollers and one of said V-shaped arrangement is provided for each of said two rollers, and wherein, in a clamping state of the clamping-roller freewheel, one of said two rollers is in immediate contact with the cylindrical lateral surface and the clamping contour, and another of said two rollers, given a same direction of rotation, is not in contact with at least one of the cylindrical lateral surface and the clamping contour, and
   wherein said two rollers include a left roller and a right roller, and with respect to each said V-shaped arrangement said left clamping area defines a left leg and said right clamping area defines a right leg, wherein a first respective V-shaped arrangement is for said left roller and a second respective V-shaped arrangement is for said right roller, said left roller engages said left leg of said first respective V-shaped arrangement and said right roller engages said right leg of said second respective V-shaped arrangement, and wherein at least one of (i) upon movement of the rollers to the right relative to the clamping contour, the right roller remains engaged with the right leg of the second respective V-shaped arrangement and the left roller disengages from the left leg of the first respective V-shaped arrangement and engages the right leg of the first respective V-shaped arrangement, and (ii) upon movement of the rollers to the left relative to the clamping contour, the left roller remains engaged with the left leg of the first respective V-shaped arrangement and the right roller disengages from the right leg of the second respective V-shaped arrangement and engages the left leg of the second respective V-shaped arrangement.

2. The clamping-roller freewheel according to claim 1, further comprising a cage including, in a circumferential direction, at least one contact surface for each of the two rollers to rest against in the clamping state.

3. The clamping-roller freewheel according to claim 2, further comprising a spacer element located between said two rollers configured as a separate element and not connected to the cage.

4. The clamping-roller freewheel according to claim 3, wherein the spacer element is rigid.

5. The clamping-roller freewheel according to claim 1, wherein the clamping contour defines a plurality of said double clamping contour, each comprising said V-shaped arrangement, and two adjacent of said V-shaped arrangements are configured for a pair of rollers and together form a W-shaped arrangement.

6. The clamping-roller freewheel according to claim 1, having a plurality of said V-shaped arrangement and a protrusion located between two neighboring of said V-shaped arrangements.

7. The clamping-roller freewheel according to claim 1, further comprising a tappet device defining a free tappet angle, and a transmission device defining a free transmission angle, and either the free transmission angle is equal to or greater than the free tappet angle or the free tappet angle is greater than or equal to the free transmission angle.

8. The clamping-roller freewheel according to claim 1, wherein the adjustment device is an adjustment device in a motor vehicle seat.

9. The clamping-roller freewheel according to claim 1, wherein a gap extends, respectively, between the left leg and the cylindrical lateral surface and between the right leg and the cylindrical lateral surface.

10. The clamping-roller freewheel according to claim 1, wherein the housing comprises the cylindrical lateral surface.

11. The clamping-roller freewheel according to claim 1, further comprising a bearing ring defining the cylindrical lateral surface.

12. The clamping-roller freewheel according to claim 1, wherein the left leg and the right leg are straight or arcuate.

13. The clamping-roller freewheel according to claim 1, further comprising a gap respectively between the left clamping area and the cylindrical lateral surface and between the right clamping area and the cylindrical lateral surface, wherein the gap between the left clamping area and the cylindrical lateral surface decreases with increasing distance from the right clamping area and the gap between the right clamping area and the cylindrical lateral surface decreases with increasing distance from the left clamping area.

14. The clamping-roller freewheel according to claim 1, further comprising a spacer element between said two rollers.

15. The clamping-roller freewheel according to claim 14, wherein the spacer element comprises resilient areas and also comprises rigid areas.

16. The clamping-roller freewheel according to claim 1, wherein the clamping contour is rotationally connected to the output shaft via the housing or a bearing ring.

17. The clamping-roller freewheel according to claim 1, wherein only one single roller is allocated to the double clamping contour.

18. The clamping-roller freewheel according to claim 10, wherein the cylindrical lateral surface is defined by a cylindrical inner surface of the housing.

19. The clamping-roller freewheel according to claim 1, wherein the double clamping contour is configured such that each of the at least one roller is contactable with the left clamping area and the right clamping area.

* * * * *